Dec. 22, 1925.  1,566,362
R. B. BENJAMIN
ELECTRIC PLUG
Filed April 23, 1920

Reuben B. Benjamin
Inventor:
By
Jones, Addington, Ames & Seibold
Attorneys.

Patented Dec. 22, 1925.

1,566,362

UNITED STATES PATENT OFFICE.

REUBEN B. BENJAMIN, OF CHICAGO, ILLINOIS, ASSIGNOR TO BENJAMIN ELECTRIC MANUFACTURING COMPANY, OF CHICAGO, ILLINOIS, A CORPORATION OF ILLINOIS.

ELECTRIC PLUG.

Application filed April 23, 1920. Serial No. 375,922.

*To all whom it may concern:*

Be it known that I, REUBEN B. BENJAMIN, a citizen of the United States, residing at Chicago, in the county of Cook and State of Illinois, have invented new and useful Improvements in Electric Plugs, of which the following is a full, clear, concise, and exact description, reference being had to the accompanying drawing, forming a part of this specification.

My invention relates to electric plugs and it has special reference to improvements in such electric plugs as may be employed in connection with screw sockets of the general type that ordinarily serve as the outlets of electrical wiring systems.

More particularly, my invention relates to electric plugs of the character indicated above which comprise swiveled shells and may be employed for heavy-duty service and which embody relatively thick and inflexible cords or cables which comprise the electrical conductors for delivering comparatively large quantities of electrical energy to various translating devices. The electric plug of my present invention and the relatively heavy cord or cable that may be associated with the plug are indicative of the heavy-duty service conditions to which such plugs are particularly adapted. But, it is to be understood, that my present invention does not contemplate electric plugs that are adapted for heavy-duty service only, or for association with thick and inflexible cords only, inasmuch as electric plugs constructed in accordance with my invention may be used under various service conditions and in connection with electric cords and cables of different characteristics.

An object of my invention is to provide a simple and economical plug, possessing the above mentioned feature, that is readily and conveniently assembled. Moreover it incorporates in its structure a gripping means that engages the cable or cord comprising the electrical conductors in such manner that all tension which may be applied to the cable or cord when the electric plug is in its receiving socket is transmitted directly to the socket without exerting any force on the contact screws of binding terminals that serve to connect separably the electrical conductors to the plug terminals.

Another object of my invention is to provide an electric plug with a positive gripping means for a cable or cord comprising the electrical supply conductors, such gripping means being held in position when the plug is received or secured within its cooperating electric socket. Again, by means of my present invention having a swiveled shell, the cord or cable comprising the electrical supply conductors is not twisted or strained when the plug is being rotated, such as occurs when the plug is screwed into position in its receiving socket.

For a better understanding the nature, the scope and the characteristic features of my invention reference may now be had to the following description and the accompanying drawings in which.

Figure 1:
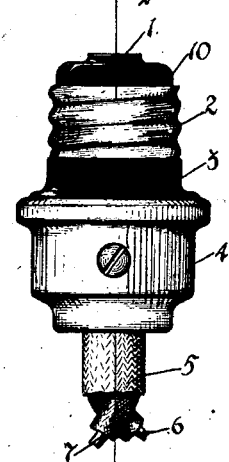
Fig. 1 is a view in elevation of an electric plug embodying a form of my invention.

Referring to Fig. 1, the electric plug comprises an upper and central electrical contact member 1 that is insulated from a shell contact member 2 which constitutes an exteriorly threaded metallic member adapted to engage the ordinary and usual electric socket having an interiorly threaded receptacle. The shell contact member 2 is secured to an insulating annular member 3 upon the lower end of which is secured a metallic casing 4. The members 2, 3, and 4 constitute the outer shell of the electric plug which may be a swiveled shell of the plug.

A cable or cord 5 extends from the lower end of the electric plug and comprises two electrical conductors 6 and 7 that are adequately insulated from each other. The two conductors 6 and 7 are, in turn, provided with an outer insulating casing that forms a unitary cable. For heavy-duty service the conductors 6 and 7 may be comparatively large and, as a consequence, the cord or cable 5 will be thick and substantially inflexible.

Figure 2:
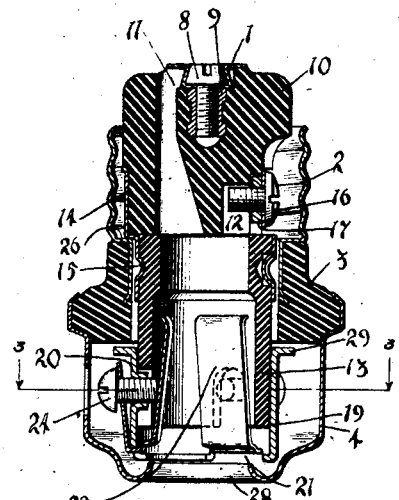
Fig. 2 is an enlarged view, partially in elevation and partially in section, taken along the line 2—2 of Fig. 1, the cords being omitted.

In Fig. 2, it will be observed that the central contact member 1 comprises a screw 8 that is received in a threaded socket 9. The socket 9 is molded into an insulating body 10 that serves as a portion of the central core of the electric plug. A longitudinally extending opening 11 permits one of the conductors comprised in the cable 5 to extend to the central contact member 1 to which it may be secured thereby establishing a good electrical contact. The insulating member 10 is also provided with a recess 12 which, as hereinafter explained, serves to permit a second electrical conductor comprised in the cable 5 to be screwed to the electric plug in order that the conductor may, in turn, be in electrical contact with the shell contact member 2. An insulating tubular extension 13 is associated with the insulating member 10 and is secured thereto by means of a spun-metal ring 14 that engages the tubular extension 13 along an annular groove 15 formed therein, adjacent to its top.

The metallic ring 14 is provided at the point where it subtends the recess 12 with an opening through which a screw 16 may project. The screw 16, in combination with a cooperating and loose nut 17 constitutes means for attaching another one of the electrical conductors to the plug, an end of the electrical conductor so attached extending into the recess 12.

Figure 3:
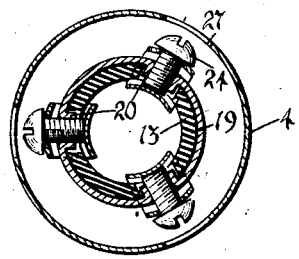
Fig. 3 is a cross sectional view taken along the line 3—3 of Fig. 2.
Figures 4, 6:
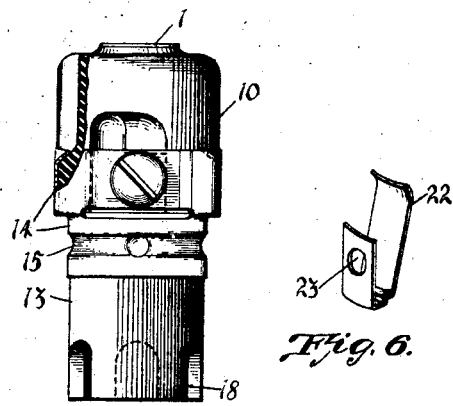
Fig. 4 is a view, partially in elevation and partially in section, of the structure illustrated in Fig. 2 with the outer shell and gripping means, however, being absent.
Fig. 6 is a perspective view of one of the gripping members comprised in my electric plug.
Figure 5:
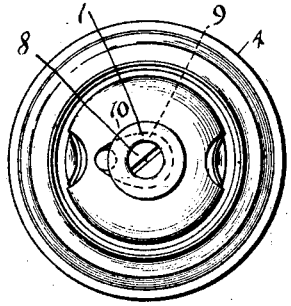
Fig. 5 is a plan view of the electrical plug illustrated in Fig. 2.

The lower end of the insulating tubular extension 13 is provided with a plurality of spaced and longitudinal recesses 18 that are formed in the lower peripheral edge thereof, as shown in Fig. 4. An annular holder 19 embraces the lower end of the tubular extension 13 and is provided at points opposite to the recesses 18 with threaded bosses 20 correspondingly located. Recesses 21 are formed in the lower edge of the holder 19. A resilient two-ply element 22, such as is illustrated in Fig. 6, is received in each of the recesses 21 in such manner that the resilient member 22 is fulcrumed on the lower periphery of the holder 19, as shown in Fig. 2. The outer leaf of each of the two-ply members 22 is provided with an opening 23 which registers exteriorly of the holder 19 with the threaded bosses 20. Screws 24 extend through the openings 23 formed in the members 22 and are threaded into the bosses 20, as is best shown in Fig. 3.

The annular holder 19, the two-ply resilient members 22, and the screws 24 constitute the gripping means of the electric plug. It will be observed that the screws 24 project through the recesses 18 formed in the tubular extension 13 and the longer leaves of the two-ply members 22 are located interiorly of the tubular extension 13. In this manner an electric cord or cable, such as the cable 5 of Fig. 1, when it extends through the tubular extension 13 may be firmly held in contact with the said gripping means.

The central core of the electric socket constitutes the insulating member 10, the tubular extension 13 and the metallic ring 14 and, in combination with the gripping means, are contained within the outer shell or casing comprising the shell contact member 2, the insulating ring 3 and the metal casing 4.

It will be observed by referring to Fig. 2 that the shell contact member 2 has its lower edge molded into the insulating annular member 3. Electrical contact between the shell contact member 2 and the screw 16, to which one of the electrical conductors is secured, is effected when the plug is assembled by reason of the mechanical contact established between the annular ring 14 and an inwardly extending shoulder 26 formed on the lower portion of the shell contact member 2. The casing 4 is provided at points opposite to the screws 24 with openings 27 which permit of the screws 24 being tightened or loosened, as is desired, by a suitable instrument projecting through the openings 27.

In assembling the electric plug, the cord or cable 5 is extended through an opening 28 that is formed by the lower periphery of the casing 4 and extends through the tubular member 13. The conductors 6 and 7 of this electric cable are connected to the screws 8 and 16. Then the gripping means is adjusted with reference to the tubular extension 13 in order that the outer shell of the electric plug may be properly positioned. The screws 24 of the gripping means are then tightened whereby the resilient members 22 may firmly grip the cable or cord 5. Before the electric plug is received in its cooperating socket, the outer shell which contains the central core and the gripping means is precluded from being disarranged after the gripping means has been adjusted to positively grip the cable because a shoulder 29 that is formed on the upper periphery of the holder 19 prevents the outer shell from sliding downwardly of the central core.

When the electric plug is received in its cooperating socket the shell contact member 2, on being screwed into the receptacle, draws the outer shell upwardly relatively to the central core, thereby establishing good electrical contact between the shell contact member 2 and the annular ring 14 which, in turn, is directly connected to one of the electrical conductors comprised in the cable. In this position the outer shell engaging the gripping holder 19 at its lower periphery holds the gripping means in position. Any strains imposed upon the electric plug through the cable 5 are transmitted through the gripping means to the outer shell member which, in turn, transmits the strains to the cooperating socket. It is apparent that the outer shell member is swiveled thereby permitting my plug to be screwed in its receiving socket without twisting or rotating the cable or cord.

While I have shown and described in detail one embodiment of my invention, it is to be understood that I do not desire to be limited to the specific arrangement of parts shown, or to the specific structure forming the gripping means, since many modifications may be made in the electric plug herein illustrated without departing from the spirit and scope of the appended claims.

This case is a continuation as to common subject matter of my copending application Serial No. 94,861. Certain claims generic to this application are presented in my copending application Serial No. 400,063.

Having thus described my invention, what I claim as new and desire to secure by Letters Patent is:

1. A strain relief construction comprising an insulating base having a tubular portion affording a passage way for a wire, a metal sleeve surrounding said tubular portion, and jaws extending into said tubular portion for gripping the wire, and means mounting said jaws on said metal sleeve.

2. A strain relief construction comprising an insulating base having a tubular portion affording a passage way for a wire, a metal sleeve surrounding said tubular portion, jaws attached to said metal sleeve and extending into said tubular portion for gripping the wire, and means mounted on said metal sleeve for operating said jaws.

3. A strain relief construction comprising an insulating base having a tubular portion affording a passage way for a wire, a metal sleeve surrounding said tubular portion, jaws mounted on said metal sleeve and extending into said tubular portion for gripping the wire, and screws mounted on said metal sleeve for operating said jaws.

4. An attachment plug comprising an insulating base, a wiring terminal mounted thereon, a threaded shell contact swiveled with respect thereto, an insulating ring secured to said threaded shell, a cup-shaped handle secured to said ring for screwing the shell contact into the socket, and a strain relief means for a wire leading to said wiring terminal held in place by said cup-shaped handle member.

5. An electrical connector comprising an insulating base, clamping means for gripping a conductor, a housing for said clamping means secured to said base, and means for moving said clamping means relative to said housing to cause said clamping means to grip the conductor, said housing having an opening therein affording access to said means for moving the clamping means for operating the latter.

6. An electrical connector comprising an insulating base having an abutment portion; conductor-gripping means; a housing for said conductor-gripping means secured to said base, said housing comprising a portion surrounding said conductor-gripping means and an abutment portion, said conductor-gripping means being held in place between abutment portions and prevented by said abutment portions from having any substantial longitudinal movement therebetween, and means independent of said housing for operating said clamping means.

7. An electrical connector comprising an insulating base having an abutment portion, conductor-gripping means, and a housing for said conductor-gripping means surrounding said base and secured thereto, said housing having a portion surrounding said conductor-gripping means, and an abutment portion, said conductor-gripping means being held in place between said abutment portions, and prevented by said abutment portions from having any substantial longitudinal movement therebetween.

8. A strain relief construction comprising an insulating base having a tubular portion affording a passage way for a wire, a metal sleeve surrounding said tubular portion, jaws attached to said metal sleeve and extending into said tubular portion for gripping the wire, and means mounted on said metal sleeve for operating said jaws in a direction radially of said tubular portion.

9. A strain relief construction comprising an insulating base having a tubular portion affording a passage way for a wire, a metal sleeve surrounding said tubular portion, a plurality of sheet metal jaws attached to the exterior of said metal sleeve and extending around the end thereof into said tubular portion for gripping the wire, and a common means for attaching and for operating said jaws.

10. A strain relief construction comprising an insulating base having a tubular portion affording a passage way for a wire, a metal sleeve surrounding said tubular portion, jaws mounted on said metal sleeve and extending into said tubular portion for gripping the wire, and screws extending through the wall of said metal sleeve radially thereof and serving to exteriorly attach said jaws to said metal sleeve and also bearing against said jaws internally of said tubular portion for operating said jaws.

In witness whereof, I have hereunto subscribed my name.

REUBEN B. BENJAMIN.